(12) United States Patent
Frische

(10) Patent No.: US 6,363,193 B1
(45) Date of Patent: Mar. 26, 2002

(54) ENDOSCOPE OPTICS

(75) Inventor: Holger Frische, Buchholz (DE)

(73) Assignee: Olympus Winter & IBE GmbH, Hamburg (DE)

( * ) Notice: Subject to any disclaimer, the term of this patent is extended or adjusted under 35 U.S.C. 154(b) by 0 days.

(21) Appl. No.: 09/591,668

(22) Filed: Jun. 12, 2000

(30) Foreign Application Priority Data

Jun. 17, 1999 (DE) .......................................... 199 27 631

(51) Int. Cl.⁷ .............................. G02B 6/06; A61B 1/04; A61B 1/06
(52) U.S. Cl. ........................ 385/119; 385/117; 385/902; 600/162; 600/109; 600/167
(58) Field of Search ................................. 385/902, 117; 600/162, 109; 396/17

(56) References Cited

U.S. PATENT DOCUMENTS 4,440,157 A * 4/1984 Shishido ........................ 128/6

* cited by examiner

Primary Examiner—Hemang Sanghavi
Assistant Examiner—Scott A Knauss
(74) Attorney, Agent, or Firm—Rankin, Hill, Porter & Clark LLP

(57) ABSTRACT

An endoscope optics including a housing receiving an image-observation device and a tubular stem. The stem is secured to a distal end of the housing. An image transmitting device is mounted inside the stem. The image-observation device is aligned inside the housing with the image transmitting device regarding image position and image center. An insert element is used to adjust the image-observation device and includes an outer contour, which allows stationary affixation to the housing, and an inner, axially continuous borehole, which receives the image-observation device in geometrically interlocking manner. The relative position between the borehole and the outer-wall contour inside the insert element is determined by spatial coordinates ascertained for the particular endoscope optics and specifying the position at which to adjust the image-observation device inside the housing relative to the image transmitting device.

16 Claims, 1 Drawing Sheet

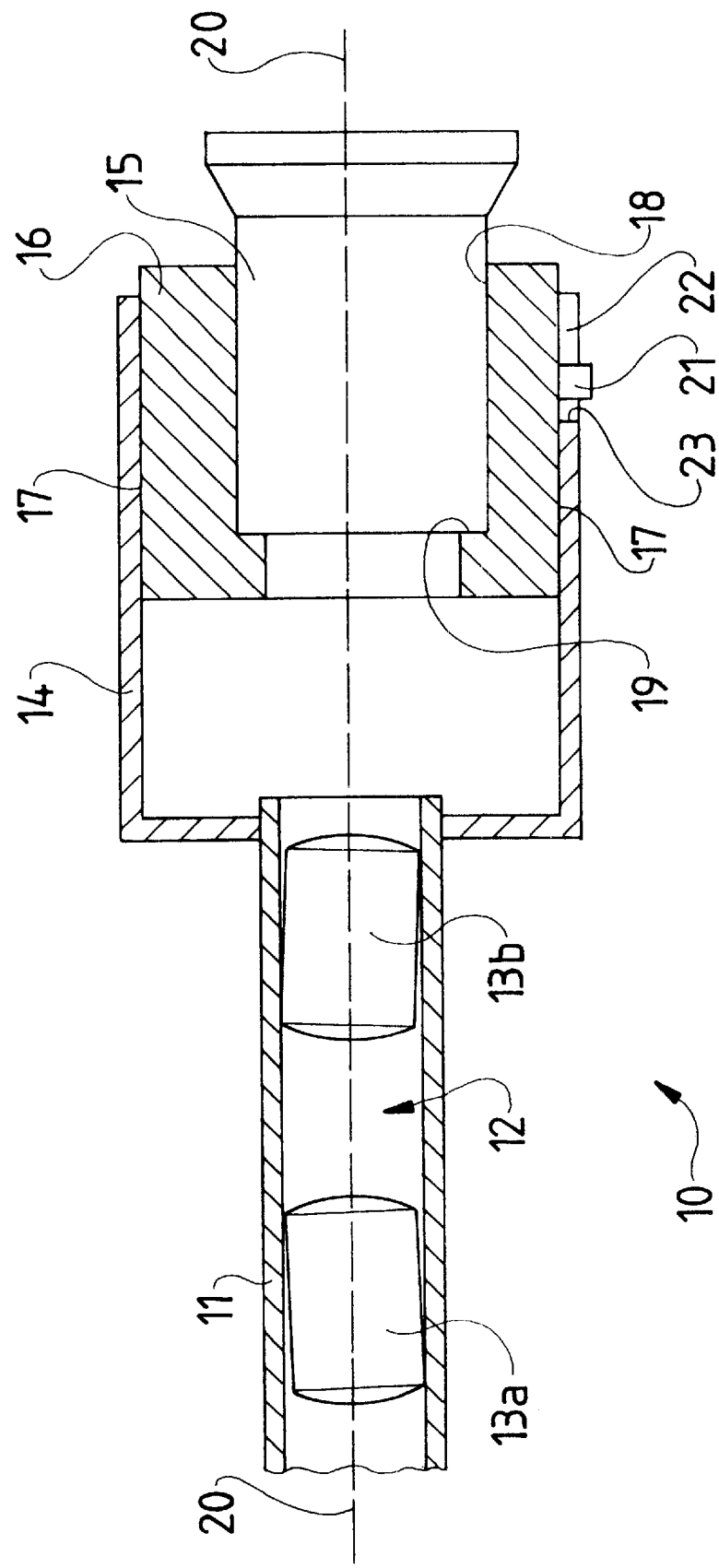

ENDOSCOPE OPTICS

BACKGROUND OF THE INVENTION

FIELD OF THE INVENTION

The present invention relates to endoscope optics comprising a proximal housing receiving an image-observation device and a tubular stem mounted distally on the housing, wherein an image transmitting means is mounted inside the stem and image-observation device is aligned inside the housing with the image transmitting means regarding image position and image center.

Such endoscope optics are known from the German patent document A1 197 42 454 and from the East German patent document B1 237 723.

An eccentric insert element to adjust an image-observation device relative to the image transmission means of an endoscope is known from the European patent document A1 0,058,020.

Endoscope optics of this kind comprise a distal tubular stem receiving an axial image transmitting means. This image transmitting means illustratively may be a lens (multiple lens elements), optical fibers, or the like.

The tubular stem is connected at its proximal end to a housing that receives an image-observation device or viewer. Typically, this device is an ocular or, for instance, a video camera.

The image transmitting means transmits an image from its distal end to its proximal end. The image generated at the proximal transmission end can be observed through the ocular and/or transmitted by a video camera to a monitor. Such a design, however, requires that the image-observation device or viewer be adjusted relative to the proximal end of the image transmitting means with respect to image position and image center in order to secure focus and the optimal viewing angle.

This adjustment must be undertaken for every endoscope optics. At the present time such adjustment is by means of adjusting screws controlling the position of the image-observation device in the three space coordinates. This kind of adjustment is fairly cumbersome and demands substantial time.

Accordingly, there is a need in the art for endoscope optics that can be adjusted in a simple manner.

SUMMARY OF THE INVENTION

The present invention is directed toward endoscope optics that are easily and simply adjusted.

In accordance with the present invention, a special insert element is used to adjust the image-observation device or viewer. The insert element comprises a contoured outer wall by means of which the insert element is connected, in a fixed manner, to the housing. The insert element has an axial borehole extending therethrough. The axial borehole receives the image-observation device in a play-free manner.

In further accordance with the present invention, the insert element is configured such that, in its installed position, the axial borehole is aligned with the image transmitting means. Accordingly, an image-observation device or viewer inserted in the borehole is adjusted relative to the optic axis of the image transmitting means.

In further accordance with the present invention, a test image-observing device displaceable in a defined system of coordinates is used in the manufacture of the insert element. The test device corresponds to or simulates the dimensions and optical properties of the actual optics. This test image-observing device is introduced into the insert element and, while being optically monitored, is moved into a position where it is adjusted relative to the proximal end of the image transmitting means. The adjustment is carried out with respect to the image center and image position, that is in relation to three coordinate axes. The relative coordinates within which the test image-observing device is adjusted in the particular endoscope housing may then be relayed to an automated system that will manufacture the special optics on the basis of the ascertained insert-element coordinates.

In further accordance with the present invention, there are a number of different ways to manufacture the insert element. The insert element may be a premanufactured part with an external contour already matching the housing and, then, only the borehole for image observation needs to be made in the insert element in the eccentric position possibly already ascertained. Alternatively, the borehole may have been prefabricated in the insert element and its position may be finished in the insert element by processing the insert element outer contour. Obviously as well, the outer-wall contour and borehole of the insert element may be manufactured one at a time in a blank.

As mentioned above, the insert element of the present invention is intended to adjust the image-observation device regarding image center and image position relative to the image transmitting means, or at least to make such adjustment substantially easier. Accordingly, the present invention includes an insert element which, during installation in the endoscope, can be affixed in a simple manner at a defined angular and axial position relative to the housing. The present invention also includes such an insert element wherein the continuous borehole shall be aligned with the optical axis of the image transmitting means. Only the image-observation device needs to be inserted into the borehole and affixed in a defined axial position and, as a result, the image position also shall have been set. The connection of the corresponding parts in their desired positions can be facilitated, for instance, by using markings at the insert element and at the image-observation device etc.

Preferably, however the insert element is constrained or required to be introduced at a given angular position and as far as an axial stop in the housing. Similarly, the image-observation device, once inserted, abuts against an axial stop in the borehole. During installation in the endoscope, the individual parts then must be nested in the only possible way and be soldered or bonded for permanent connection to each other. In this manner, installation is made much easier.

Provision may be made in this respect that the insert-element's outer wall contour shall be polarized such that the inert element can only be introduced into the housing in only one angular position. Illustratively, the insert element's outer wall or contour may include a protrusion or key which must be introduced in a slot or keyway of the housing running from the housing's upper edge. The opposite, closed end of the slot or keyway, at the same time, may constitute an axial stop representing the limit by which the insert element can be introduced for adjustment.

Moreover the inside wall of the housing may provide a stop. The insert element's outside wall contour and the housing's inside wall shall be so matched (for instance, by means of the cross-section of an irregular triangle) so that the insert element may be introduced only in a particular angular position as far as the housing's inside stop.

Preferably, another axial stop for the image-observation device may be provided in the inner insert element borehole, which, for instance, may be in the form of a stepped borehole. If during installation the image-observation device is advanced as far as the stop and if the insert element is introduced into the housing at the proper angular and axial position, then the image-observation device shall be automatically adjusted relative to the image position and center of the image transmitting means.

The insert element may be made, for instance, of plastic or aluminum. What is critical is that it be made of material which can be easily worked and which shall be resistant, especially to temperature, under the ordinary conditions of service of the endoscope optics. Furthermore, the insert element may be in the form of a sleeve or bush. Obviously, other geometries or shapes are also possible. The significant requirement is merely that the insert element comprises outer wall zones allowing defined affixation to the housing and that it also comprise an inner, continuous borehole to receive the image-observation device. The expression "borehole" herein denotes any kind of clearance axially passing through the insert element and receiving the image-observation device in a defined manner.

BRIEF DESCRIPTION OF THE DRAWING

These and further features of the invention will be apparent with reference to the following description and drawing, wherein a preferred embodiment of the present invention is diagrammatically illustrated.

DETAILED DESCRIPTION OF THE PREFERRED EMBODIMENT

With reference to the drawing, an endoscope optics 10 according to the present invention is illustrated. The endoscope optics has a distal, tubular stem 11 inside of which is mounted an image transmitting means 12 consisting of lens elements 13a, 13b.

The tubular stem 11 is situated proximally to a housing 14 receiving an image-observation device, which, in this instance, is an ocular 15.

As already mentioned, the ocular 15 and the image transmitting means 12 must be mutually adjusted with respect to image position and center. An insert element 16 mounted inside the housing 14 is used for such adjustment. The insert element 16 comprises an outer contour or peripheral shape that is adapted for introduction into the housing 14 in a mechanically polarized or specially oriented manner. In other words, the insert element 16 geometrically interlocks with the housing 14. The insert element 16 is has a continuous borehole 18 extending therethrough. The borehole 18 receives the ocular 15 in a mechanically polarized manner. The borehole 18 has a reduced diameter at its distal end so as to define a step 19 that serves as a distal, axial stop for the ocular 15.

As shown in the drawing, the borehole 18 is eccentric relative to the insert element 16. The eccentric position of the borehole 18 in the insert element 16 relative to its outer contour 17 is selected such that the borehole 18 and, more particularly the ocular 15 received therein, when in a defined angular position of the insert element 16 relative to the housing 14, will be aligned with the optic axis 20 of the image transmission means.

A protrusion or key 21 is formed on and extends from the outer contour 17 of the insert element 16. The protrusion 21 is received in a slot 22 of the housing 14 and is used to set the proper angular position of the insert element 16 in the housing 17.

The insert element 16 together with its borehole 18 shall be in the position aligned with the optic axis 20 only when the protrusion 21 has been introduced into the slot 22 of the housing 14. Furthermore, by its distal end, the slot 22 also constitutes a stop 23 for the protrusion 21 and, hence, for the insert element 16.

The stop 23 and the step 19 are designed such that, when the optics are in the assembled state wherein the insert element 16 and the ocular 15 are advanced as far as the stops 23, 19, the ocular will be optically adjusted (focused) with respect to the image position. Accordingly the endoscope optics 10 of the shown embodiment can be installed and properly adjusted in a simple manner.

The sole significant requirement is to use an insert element of the invention matching the endoscope optics. For that purpose and in the manner described above, the relative spatial coordinates of the optically adjusted position of the ocular within the housing are determined and the insert element is manufactured based on this data.

As discussed above, the manufacture of an appropriate insert element can be carried out, for instance, by appropriately processing its outer contour and/or by making a borehole in a defined position. The processing steps may be extensively automated by conventional automated machinery. To determine the adjusted ocular position or the adjusted position of another image-observation device, for instance in a testing procedure, no more is required than to configure each endoscope optics by means of an appropriate image-observation device and to determine the particular spatial coordinates for an optimal adjustment inside the housing. Thereupon, these spatial coordinates can be relayed, for instance, to the automated machinery manufacturing the insert element.

Based on the shown embodiment and further assuming that the insert element 16 is available in standard form with a pre-finished outer contour 17 including the protrusion 21, then the spatial coordinates determined while sizing the endoscope optics shall be used to create the continuous borehole 18 in the already pre-finished insert element 16 in the desired eccentric position and at the required depth of the step. It is understood that the positioning of the eccentric borehole must relate to the protrusion 21. For example, the protrusion 21 may be denoted as being at the angular position 0°.

What is claimed is:

1. An endoscope optics comprising a housing and a tubular stem, said housing having a proximal end receiving an image-observation device, said tubular stem being secured to a distal end of said housing and extending therefrom, an image transmitting means being mounted inside the stem, the image-observation device being aligned inside the housing with the image transmitting means regarding image position and image center, wherein an insert element (16) is used to adjust the image-observation device (15), said insert element having an outer contour (17) and having a borehole (18) extending through said insert element, said outer contour (17) allowing stationary affixation to the housing (14) and said borehole (18) being adapted to receive the image-observation device (15) in a geometrically interlocking manner, a relative position of the outer-wall contour (17) and the borehole (18) inside the insert element (16) being determined by means of the spatial coordinates ascertained for the endoscope optics (10) and specifying the position at which to adjust the image-observation device (15) inside the housing (14) relative to the image transmitting means (12).

2. The endoscope optics as claimed in claim 1, wherein the outer-wall contour (17) of the insert element (16) and the housing (14) are matched to each other so that the insert element (16) and the housing (14) can be made to engage in a geometrically interlocking manner.

3. The endoscope optics as claimed in claim 2, wherein interlocking engagement is possible only at a defined angular position.

4. The endoscope optics as claimed in claim 3, wherein the housing includes a stop (23) and insertion of the insert element (16) is limited by said stop.

5. The endoscope optics as claimed in claim 1, wherein a stop (19) is disposed in the borehole (18) and limits insertion of the image-observation device (15) into the borehole (18).

6. The endoscope optics as claimed in claim 2, wherein a stop (19) is disposed in the borehole (18) and limits insertion of the image-observation device (15) into the borehole (18).

7. The endoscope optics as claimed in claim 3, wherein a stop (19) is disposed in the borehole (18) and limits insertion of the image-observation device (15) into the borehole (18).

8. The endoscope optics as claimed in claim 4, wherein a stop (19) is disposed in the borehole (18) and limits insertion of the image-observation device (15) into the borehole (18).

9. The endoscope optics as claimed in claim 1, wherein the image-observation device (15) is an ocular.

10. The endoscope optics as claimed in claim 2, wherein the image-observation device (15) is an ocular.

11. The endoscope optics as claimed in claim 3, wherein the image-observation device (15) is an ocular.

12. The endoscope optics as claimed in claim 4, wherein the image-observation device (15) is an ocular.

13. The endoscope optics as claimed in claim 5, wherein the image-observation device (15) is an ocular.

14. The endoscope optics as claimed in claim 6, wherein the image-observation device (15) is an ocular.

15. The endoscope optics as claimed in claim 7, wherein the image-observation device (15) is an ocular.

16. The endoscope optics as claimed in claim 8, wherein the image-observation device (15) is an ocular.

* * * * *

UNITED STATES PATENT AND TRADEMARK OFFICE
CERTIFICATE OF CORRECTION

PATENT NO.    : 6,363,193 B1
DATED         : March 26, 2002
INVENTOR(S)   : Frische It is certified that error appears in the above-identified patent and that said Letters Patent is hereby corrected as shown below:

<u>Title page,</u>
Item [56], References Cited, add the following
--     FOREIGN PATENT DOCUMENTS
       0 058 020 - Europe
       197 42 454 A1 - Germany
       237 723 B1 - Germany --.

Signed and Sealed this

Third Day of September, 2002

*Attest:*

*Attesting Officer*

JAMES E. ROGAN
*Director of the United States Patent and Trademark Office*